US008443672B2

(12) United States Patent  
Seeley et al.

(10) Patent No.: US 8,443,672 B2
(45) Date of Patent: May 21, 2013

(54) LOW-POWER SHOCK AND VIBRATION SENSORS AND METHODS OF MAKING SENSORS

(75) Inventors: Charles Erklin Seeley, Niskayuna, NY (US); Eladio Clemente Delgado, Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1606 days.

(21) Appl. No.: 11/652,498

(22) Filed: Jan. 12, 2007

(65) Prior Publication Data

US 2008/0168840 A1 Jul. 17, 2008

(51) Int. Cl.
*G01H 11/00* (2006.01)
(52) U.S. Cl.
USPC ............................................. 73/649; 73/664
(58) Field of Classification Search .............. 73/649, 73/570, 599, 647, 664
See application file for complete search history.

(56) References Cited

U.S. PATENT DOCUMENTS

| | | | | |
|---|---|---|---|---|
| 4,552,028 A | * | 11/1985 | Burckhardt et al. | 73/862.041 |
| 4,711,128 A | * | 12/1987 | Boura | 73/514.18 |
| 4,885,623 A | * | 12/1989 | Holm-Kennedy et al. | 257/290 |
| 4,891,984 A | * | 1/1990 | Fujii et al. | 73/514.33 |
| 4,916,505 A | * | 4/1990 | Holm-Kennedy | 257/290 |
| 4,926,682 A | * | 5/1990 | Holm-Kennedy et al. | 73/54.01 |
| 4,926,693 A | * | 5/1990 | Holm-Kennedy et al. | 73/597 |
| 4,951,510 A | * | 8/1990 | Holm-Kennedy et al. | 73/862.041 |
| 5,083,466 A | * | 1/1992 | Holm-Kennedy et al. | 73/862.041 |
| 5,090,254 A | * | 2/1992 | Guckel et al. | 73/862.59 |
| 5,095,762 A | * | 3/1992 | Holm-Kennedy et al. | 73/862.041 |
| 5,101,669 A | * | 4/1992 | Holm-Kennedy et al. | 73/862.626 |
| 5,466,348 A | * | 11/1995 | Holm-Kennedy | 205/775 |
| 5,473,930 A | * | 12/1995 | Gademann et al. | 73/1.38 |
| 5,784,507 A | * | 7/1998 | Holm-Kennedy et al. | 385/31 |
| 5,834,646 A | * | 11/1998 | Kvisteroy et al. | 73/514.29 |
| 6,034,613 A | * | 3/2000 | Hart et al. | 340/683 |
| 6,051,380 A | * | 4/2000 | Sosnowski et al. | 435/6.11 |
| 6,485,905 B2 | * | 11/2002 | Hefti | 435/6.11 |
| 6,564,637 B1 | * | 5/2003 | Schalk et al. | 73/504.12 |
| 6,807,872 B2 | * | 10/2004 | Le Traon et al. | 73/862.632 |
| 7,188,511 B2 | * | 3/2007 | Stuetzler | 73/12.01 |
| 7,231,803 B2 | * | 6/2007 | Stuetzler | 73/12.01 |
| 7,475,607 B2 | * | 1/2009 | Oboodi et al. | 73/862.639 |
| 7,692,219 B1 | * | 4/2010 | Holm-Kennedy | 257/253 |
| 8,066,945 B2 | * | 11/2011 | Willett et al. | 422/82.01 |
| 2005/0136419 A1 | * | 6/2005 | Lee | 435/6 |
| 2005/0150305 A1 | * | 7/2005 | Oboodi et al. | 73/774 |
| 2008/0258179 A1 | * | 10/2008 | Tour et al. | 257/253 |

* cited by examiner

*Primary Examiner* — Peter Macchiarolo
*Assistant Examiner* — Samir M Shah
(74) *Attorney, Agent, or Firm* — Withrow & Terranova, PLLC

(57) ABSTRACT

Sensors for monitoring shock or vibration of an object are provided. The sensors include a proof mass, at least piezoelectric device, and an electronic circuit connected to the piezoelectric device. The piezoelectric device generates a current when the proof mass imparts a force on the piezoelectric device in response to the proof mass being subjected to a transient acceleration when the object is subjected to a shock or vibration. The electronic circuit is at least partially controlled in response to the current generated from the piezoelectric device due to the shock or vibration. Embodiments of the sensor provide multi-axis sensing capabilities. Methods of making the sensors and flexible circuits are also provided.

33 Claims, 8 Drawing Sheets

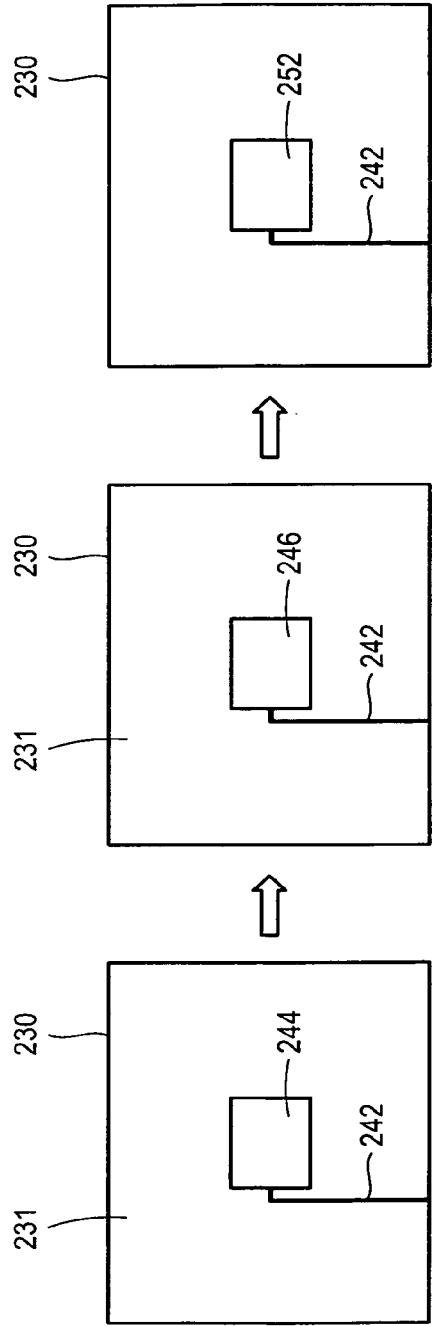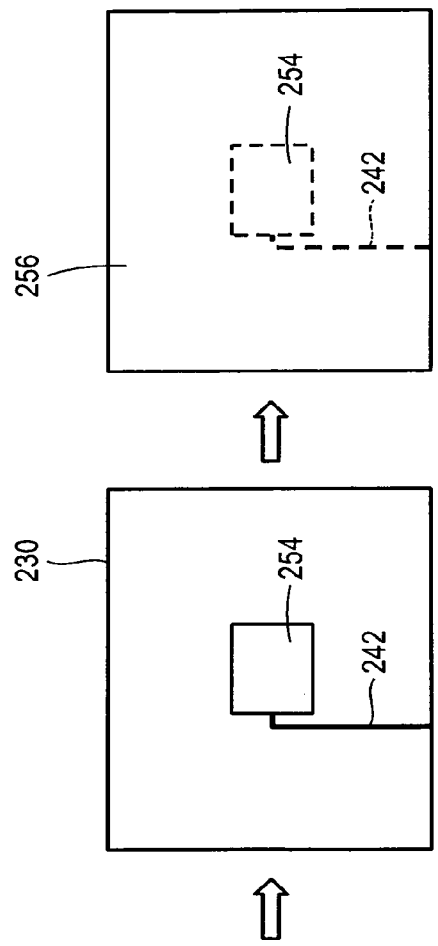

LOW-POWER SHOCK AND VIBRATION SENSORS AND METHODS OF MAKING SENSORS

BACKGROUND

There are applications in which it is desirable to monitor certain equipment for possible exposure to excessive vibration or shock that could cause damage to the equipment. Such equipment may need to be monitored continuously for extended time periods without service or an external electrical power supply. There is a need for a sensor that can be used in such applications.

SUMMARY

Low-power sensors for monitoring exposure of an object to a stimulus are provided. An exemplary embodiment of the low-power sensors comprises a proof mass; at least one piezoelectric device operable to generate a current when the proof mass imparts a force on the piezoelectric device in response to the proof mass undergoing a transient acceleration when the object is subjected to a stimulus; and an electronic circuit connected to the piezoelectric device. The electronic circuit is at least partially controlled in response to the current generated from the first piezoelectric device due to the stimulus.

Another exemplary embodiment of the low-power sensors for monitoring exposure of an object to a stimulus a proof mass is provided. The sensor comprises at least first, second and third surfaces perpendicular to orthogonal x, y and z axes, respectively. The sensor comprises at least one first piezoelectric device operatively associated with the first surface, at least one second piezoelectric device operatively associated with the second surface, and at least one third piezoelectric device operatively associated with the third surface. At least one of the first, second and third piezoelectric devices is operable to generate a current when the proof mass imparts a force thereon in response to the proof mass undergoing a transient acceleration when the object is subjected to a stimulus. The sensor comprises first, second and third electronic circuits connected to the first, second and third piezoelectric sensors, respectively, and which are at least partially controlled in response to the current generated from at least one of the first, second and third piezoelectric devices, respectively, due to the stimulus.

Flexible circuits are also provided. An exemplary embodiment of the flexible circuits comprises at least one piezoelectric device comprising a flexible substrate composed of a first dielectric material; at least one first electrode on a surface of the substrate; at least one first layer of piezoelectric material on the first electrode; a second dielectric material on the first layer of piezoelectric material; a second electrode on the second dielectric material; and at least one second layer of piezoelectric material on the second electrode. The flexible substrate comprises cut lines and fold lines along which the flexible circuit can be folded to form a three-dimensional structure.

DRAWINGS

FIGS. 3A to 3E illustrate a series of steps of an exemplary method for fabricating a piezoelectric device.

DESCRIPTION

Low-power shock and vibration sensors for monitoring exposure of objects to shock or vibration are provided. For conciseness, the term "stimulus" is used herein to refer to shock or vibration. Embodiments of the sensors can be used to monitor objects over extended time periods without service of the sensor, or an external power supply. Methods of monitoring objects for exposure to a stimulus, flexible circuits and methods of making the flexible circuits are also provided.

Objects that are sensitive to shock or vibration can be monitored by the sensors. For example, the objects can be easily physically damaged, caused to malfunction, react strongly, or explode when subjected to a stimulus. For example, the objects can be sensitive electronic devices or include sensitive electronic components, paintings, sculptures, glassware, containers of unstable chemicals (e.g., explosive liquid or dry chemicals), or explosive devices. The objects can have high value. The objects can be directly exposed to the environment, or housed inside of containers, for example. The sensors are operable to detect transient accelerations of such objects resulting from a stimulus. The stimulus can result from lifting, falling, sliding and/or shaking of objects, from the objects being struck by another object, an individual or the like, or from transporting objects, for example.

Figure 1:
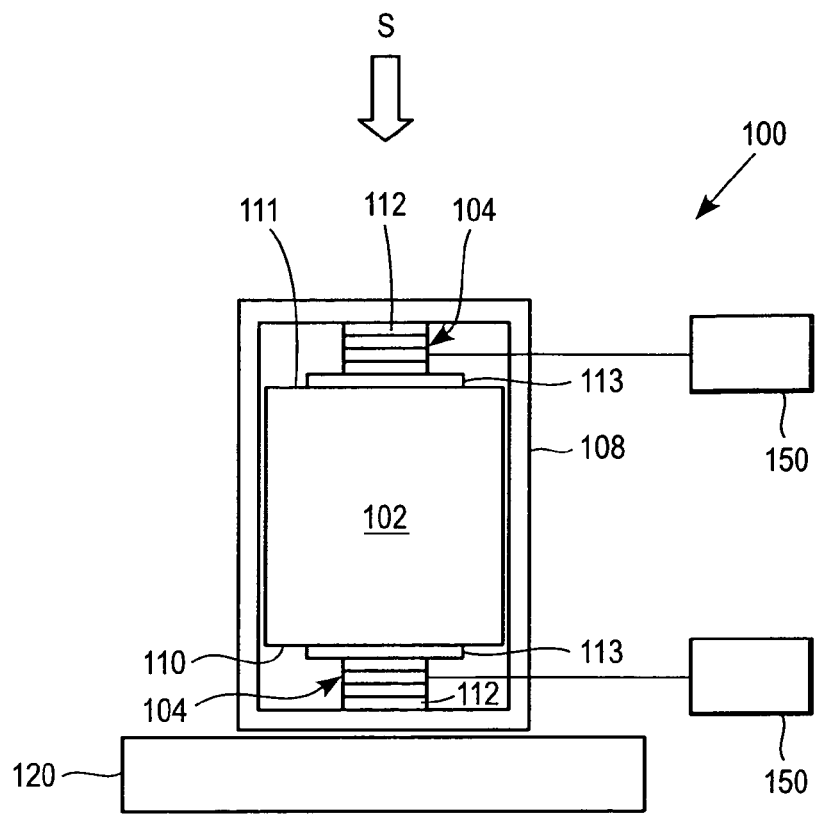
FIG. 1 is a side cross-sectional view of an exemplary embodiment of a shock and vibration sensor having single-axis sensing capabilities.

FIG. 1 depicts an exemplary embodiment of a low-power sensor 100 arranged to monitor shock or vibration of an object 120. The sensor 100 shown in FIG. 1 comprises a proof mass 102, two piezoelectric devices 104, and separate electronic circuits 150 connected to the piezoelectric devices 104. In the embodiment, the piezoelectric devices 104 and proof mass 102 are contained inside of protective housing 108.

The embodiment of the sensor 100 shown in FIG. 1 is constructed to avoid false indications that the object 120 has been subjected to a stimulus. The proof mass 102 includes a bottom surface 110 and a top surface 111 in direct contact with thrust plates 113 provided on the piezoelectric devices 104. In the embodiment, the proof mass 102 contacts the thrust plates 113 at all times (i.e., when the object 120 is at rest and when the object 120 is affected by a stimulus). The thrust plates 113 are effective to distribute forces exerted on the piezoelectric device 104 over a larger area for improved reliability. If a gap was present between the proof mass 102 and either one of the thrust plates 113, a false indication of an actual stimulus, S, could occur if the proof mass 102 collided with the thrust plate(s) 113 in response to the object 120 being subjected to a stimulus and the proof mass 102 crossing the gap between the proof mass 102 and the thrust plate(s) 113. By eliminating such gaps in the sensor 100, the sensor 100 can provide reliable sensing performance without false stimulus readings.

In the embodiment, the proof mass 102 is rigid and acts to impart a mechanical force on at least one of the piezoelectric devices 104 via the thrust plate(s) 113 when the proof mass 102 undergoes a transient acceleration. As described in greater detail below, the electronic circuits 150 connected to the piezoelectric devices 104 are at least partially controlled in response to current generated from the piezoelectric devices 104 due to the object 120 being subjected to a stimulus. This control of the electronic circuits 150 by the current generated from the stimulus allows the sensor 100 to consume low power when no transient acceleration is present.

When the object 120 is subjected to a stimulus and the proof mass 102 imparts a force on at least one of the piezoelectric devices 104 via one or more thrust plate(s) 113, the piezoelectric device(s) 104 produce(s) an electrical output due to this change in load. The mass of the proof mass 102 is sufficiently larger than the mass of each piezoelectric device 104 so that the proof mass 102 imparts a desired compressive force on the piezoelectric devices 104. For example, the proof mass 102 can have a mass of about 4 g to about 50 g. The proof mass 102 mechanically amplifies the compressive force generated by the transient acceleration of the piezoelectric devices 104 to increase the current output. Increasing the mass of the proof mass 102 (by increasing its volume) increases the current generated from the piezoelectric devices 104, but also increases the amount of space occupied by the proof mass 102. The proof mass 102 is composed of a suitable material so that it meets size constraints and provides the desired mass in the sensor 100. For example, the proof mass 102 can be composed of tungsten, steel or the like, and is typically solid.

The proof mass 102 can have any suitable shape. In the embodiment, the proof mass 102 is rectangular-shaped or square-shaped and has flat surfaces. For example, the proof mass 102 can be square-shaped and have side dimensions of about 2 mm to about 20 mm, e.g., about 5 mm.

The piezoelectric devices 104 can be made from any suitable piezoelectric material that provides desired performance characteristics in the sensor 100. For example, the piezoelectric material can be a lead zirconate titanate (PZT) ceramic material, such as PZT5H or PZT5A, or a ferroelectric material, such as PMNT. Different piezoelectric devices 104 of a given sensor 100 can include two or more different piezoelectric materials to provide different performance characteristics, e.g., greater sensitivity, with respect to monitoring different axial directions of the object.

The piezoelectric material is typically in layer form. The layers can have any suitable shape, such as rectangular, square, other polygonal shapes, circular (wafers), or the like. Layers or the piezoelectric material typically have a thickness of about 100 µm to about 1 mm, such as about 200 µm to about 500 µm. In an exemplary embodiment, the piezoelectric material is rectangular or square shaped with sides having a dimension of about 2 mm to about 10 mm. Wafers of the piezoelectric material can typically have a diameter of about 2 mm to about 10 mm.

The voltage associated with mechanical loading of a piezoelectric material increases with its thickness. To avoid an overly high voltage caused by such loading, the piezoelectric device 104 can include a plurality of relatively thinner layers of the piezoelectric material, such as two to ten layers, as opposed, for example, to one thick layer of the piezoelectric material. As shown in FIG. 1, multiple layers 112 of the piezoelectric material can be arranged in a stack. Increasing the number of layers 112 of the stack increases the total capacitance of the piezoelectric material, while the force/area (i.e., compressive stress) for the stack remains constant. Additional layers 112 of the stack occupy little additional volume inside the sensor 100.

In exemplary embodiments of the shock and vibration sensor, one or more piezoelectric devices can be selectively arranged with respect to the proof mass to allow detection of a stimulus in one or more directions that are of most interest for the particular object that the sensor is operatively associated with. The exemplary embodiment of the sensor 100 shown in FIG. 1 has single-axis sensing capabilities. In this embodiment, the piezoelectric devices 104 are arranged to allow the sensor 100 to monitor vertical motion of the object 120 due to the occurrence of a stimulus, S. In other exemplary embodiments of the sensor, piezoelectric devices can be arranged to face selected opposed side surfaces of the proof mass 102 such that the sensor can detect the occurrence of a stimulus in a selected horizontal direction.

Figure 2:
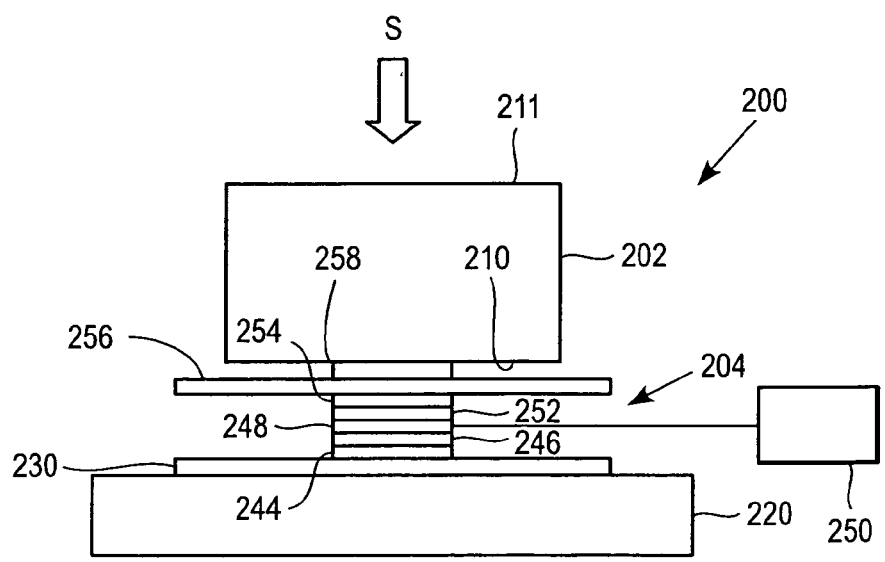
FIG. 2 is a side view of another exemplary embodiment of a shock and vibration sensor having single-axis sensing capabilities.

FIG. 2 depicts another exemplary embodiment of a single-axis sensor 200. In the embodiment, the sensor 200 comprises a piezoelectric device 204 including, in the following order, substrate 230, trace 244, piezoelectric material 246, dielectric material 248, trace 252, and piezoelectric material 254. A thrust plate 256 is provided on the piezoelectric material 254. A proof mass 202 is supported on a base 240 arranged between the thrust plate 256 and bottom surface 210 of the proof mass 202. The proof mass 202 can alternatively rest directly on the thrust plate 256. The thrust plate 256 is effective to spread out forces on the piezoelectric device 204 over a larger area for improved reliability. The sensor 200 is operable to detect a stimulus, S, to the object 220 when the proof mass 202 imparts a compressive force on the piezoelectric device 204.

A second piezoelectric device is typically provided on the top surface 211 of the proof mass 202. For simplicity, the second piezoelectric device is not shown in FIG. 2. The second piezoelectric device can have the same construction as the piezoelectric device 204, and can be provided on a thrust plate and base. The second piezoelectric device can be connected to a separate electronic circuit.

The sensor 200 can also comprise a protective rigid housing (not shown) that surrounds the proof mass 202 and the piezoelectric device(s) 204. The housing can have a structure such as that of the housing 108 shown in FIG. 1, for example.

Fabrication of an exemplary embodiment of the piezoelectric device 204 shown in FIG. 2 will be described with reference to FIGS. 3A to 3E. FIGS. 3A to 3E show a series of fabrication steps of an exemplary method of fabricating a piezoelectric device. The piezoelectric device 204 is fabricated on a substrate 230 shown in FIG. 3A. The substrate 230 is composed of a dielectric material. For example, the substrate 230 can be composed of a polymer, such as polyimide, polyetherimide, polytetrafluoroethylene (PTFE), polyetheretherketone (PEEK), or the like. The substrate 230 can have any suitable dimensions depending on the desired size of the sensor 200. For example, the substrate 230 can have length and width dimensions of about 10 mm to about 50 mm.

In the embodiment, the top surface 231 of the substrate 230 is typically cleaned, such as by etching, prior to further fabrication steps. A seed material (not shown) of a suitable metal, such as titanium, can be applied on the cleaned top surface 231. The seed material can be formed by sputtering, for example.

As shown in FIG. 3A, an electrode 242 including a trace 244 is applied on the top surface 231 of the substrate 230. The electrode material is typically a metal. For example, the electrode 242 can be composed of copper. Copper can be applied by electroplating, for example. The electrode 242 can be formed by patterning the applied metal using a masking and photolithography technique. The trace 244 is typically rectangular, square or circular shaped. The trace 244 can typically have a thickness of about 0.05 mm to about 0.5 mm, and length and width dimensions of about 1 mm to about 10 mm.

For simplicity, the embodiment shown in FIG. 3A includes only a single trace 244. In other exemplary embodiments of the piezoelectric device 204, two, three, four or more traces 244 can be formed on the substrate 230, to form multiple piezoelectric devices. The traces 244 can be arranged in any suitable pattern on the substrate 230. Two or more piezoelectric devices provide redundancy in case any one of the devices fail during service. Also, the sensor can be fabricated with various selected voltage and capacitance characteristics by combining multiple piezoelectric devices in series or parallel to match the impedance of the remainder of the circuit.

As shown in FIG. 3B, piezoelectric material 246 is applied on the trace 244. In other embodiments including multiple traces 244, piezoelectric material 246 is applied on each individual trace 244. The piezoelectric material 246 is typically in layer form configured to substantially cover the trace(s) 244. Typically, the piezoelectric material 246 is joined to the trace(s) 244 using a solder reflow process. Solder reflow processes allow each layer of the piezoelectric material 246 to be joined to the trace(s) 244 simultaneously by heating at an elevated temperature, such as in an oven. In the embodiment, more than one layer of the piezoelectric material 246 can be applied on each trace 244. Multiple layers of the piezoelectric material can be joined together, such as by a solder reflow process, to form a stack.

As shown in FIG. 3C, in the embodiment, an electrode including trace 252 formed on dielectric material 248 (FIG. 2) is provided on the piezoelectric material 246. The dielectric material 248 can be the same material as that of the substrate 230. In other embodiments in which multiple traces 244 are formed on the substrate 230, the dielectric material 248 with trace 252 is provided on each piezoelectric material 246. The electrodes with trace(s) 252 can be formed of copper, for example.

As shown in FIG. 3D, at least one layer of piezoelectric material 254 is provided on each trace 252. Multiple layers of the piezoelectric material 254 arranged in a stack can be provided on each trace 252.

Thrust plate 256 is provided on the piezoelectric material 254. The thrust plate 256 is rigid and can be composed of the same dielectric material as the substrate 230.

Other exemplary embodiments of the low-power sensor have multi-axis stimulus sensing capabilities. These embodiments of the sensor provide two-axis sensing (x, y; x, z; or y, z axes sensing), or three-axis (x, y, z) sensing.

Figure 4:
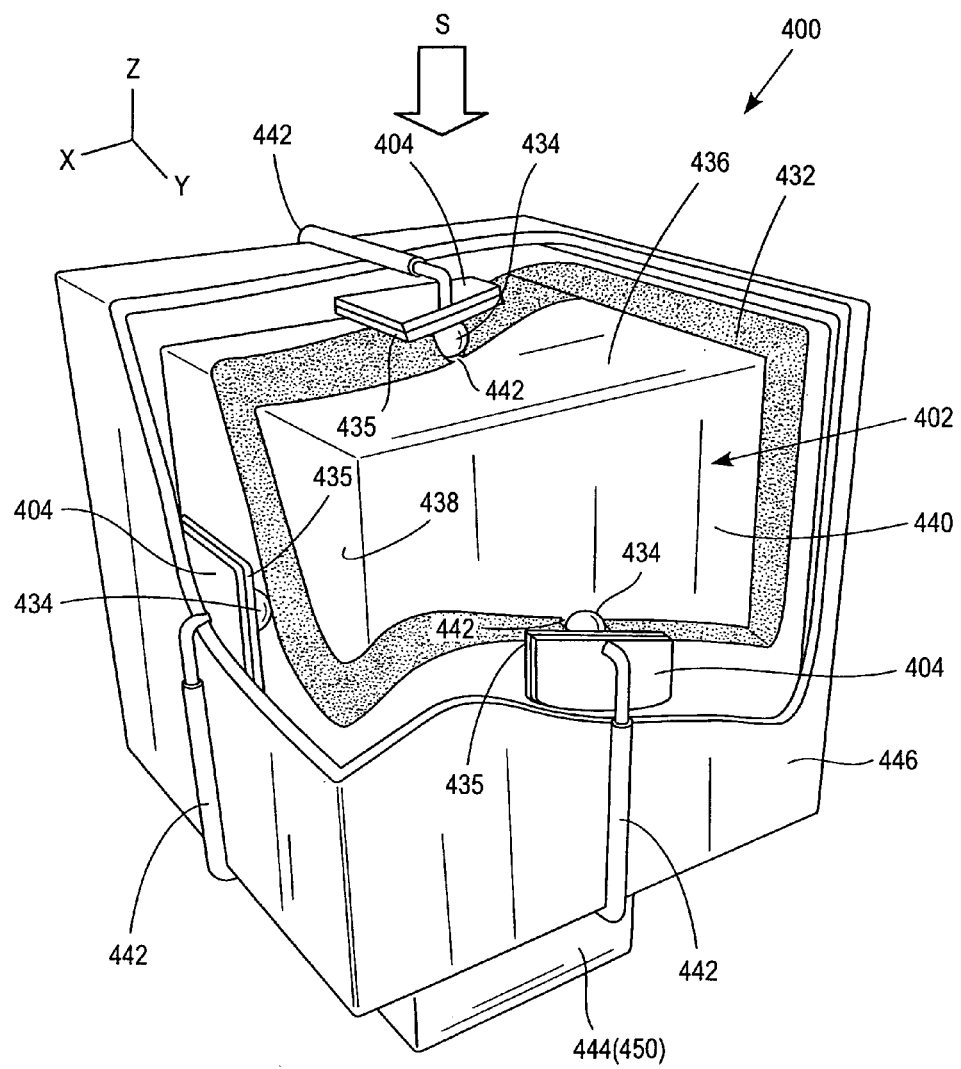
FIG. 4 is a partially broken-away view of an exemplary embodiment of a shock and vibration sensor having multi-axial sensing capabilities.

FIG. 4 depicts an exemplary embodiment of a low-power, multi-axis sensor 400 that provides three-axis shock and vibration sensing. As shown, the sensor 400 comprises a single proof mass 402 substantially surrounded by a compliant material 432. In the embodiment, the proof mass 402 is square. As shown, three piezoelectric devices 404 are positioned facing side surfaces 438, 440 and top surface 436 of the proof mass 402. These surfaces are orthogonal to x, y and z axes of the sensor 400. The sensor 400 typically includes three additional piezoelectric devices (not shown) that respectively face the other two side surfaces and the bottom surface of the proof mass 402. The sensor 400 also includes a protective rigid housing 446 that substantially surrounds the compliant material 432.

The sensor 400 includes leads 442 connected to the respective piezoelectric devices 404 and to a PC board connector 444. Each individual lead 442 can be connected to an individual electronic circuit 450.

The sensor 400 is constructed to prevent the proof mass 402 from colliding with any one of the piezoelectric devices 404 when an object that the sensor 400 is operatively associated with is subjected to a stimulus. This construction prevents associated false readings of an actual stimulus, by introducing a preload during fabrication such that the piezoelectric material of the piezoelectric devices 404 is always in compression.

In the embodiment, each piezoelectric device 404 includes a rigid thrust plate 435 provided on the front face of the piezoelectric device 404 (facing the proof mass 402). The thrust plates 435 are configured to distribute normal forces over their planar front contact surface.

In the embodiment of the sensor 400 shown in FIG. 4, low-friction surfaces are arranged between the proof mass 402 and each piezoelectric device 404. The low-friction surfaces contact the contact surface of the respective thrust plates 435 and the surfaces of the proof mass 402 at all times. In the illustrated embodiment of the sensor 400, the low-friction surfaces are surfaces of spheres 434. The spheres 434 are made of a mechanically stiff metallic material, such as steel, a ceramic material or the like. The spheres 434 rotate when the proof mass 402 moves relative to the piezoelectric devices 404 and thrust plates 435 due to the occurrence of a stimulus.

The compliant material 432 can be one or more layers of a polymer. For example, the compliant material can be an elastomer, such as RTV silicone, rubber, neoprene, foam, or the like. The compliant material 432 can have any suitable thickness, such as about 2 mm to at least about 10 mm. The compliant material 432 includes cavities 442 in which individual spheres 434 are held in place, but are able to rotate during movement of the proof mass 402. The spheres 434 act to transmit normal forces to contacts surfaces of the thrust plates 435. The thrust plates 435 spatially distribute the normal forces. The spheres 434 also minimize frictional resistance in the orthogonal directions parallel to the surfaces of the proof mass 402. By placing spheres 434 in direct contact with the surfaces 436, 438, 440 (and typically the other three surfaces) of the proof mass 402 and with the thrust plates 435, gaps are eliminated between the proof mass 402 and the thrust plates 435, orthogonal motion of the proof mass 402 is substantially not constrained by friction when a stimulus occurs, and false readings of an actual stimulus by the sensor 400 due to friction are at least substantially eliminated.

Typically, shocks or vibrations act on the multi-axis sensor 400 along two or three axial directions. Accordingly, the force associated with a stimulus typically includes components in at least two of the x, y and z axial directions. For such forces, the direction of the force can be determined by vector addition of the individual force components.

Other exemplary embodiments of the single-axis sensor can be made by modifying the sensor 400 shown in FIG. 4. For example, such single-axis sensors can include only two piezoelectric devices 404, which are operatively associated with two opposed surfaces of the proof mass 402. For example, the sensor 400 can be modified to include only the piezoelectric device 404 facing the top surface 436 of the proof mass 402 and a piezoelectric device 404 facing the opposed bottom surface (not shown) of the proof mass 402. In the embodiment, spheres 434 embedded in compliant material 432 can be arranged between the rigid housing 446 and the other four side surfaces of the proof mass 402 that are not operatively associated with a piezoelectric device. This embodiment of the sensor can provide single-axis shock and vibration sensing with minimal frictional effects on the sensing.

Figure 5:
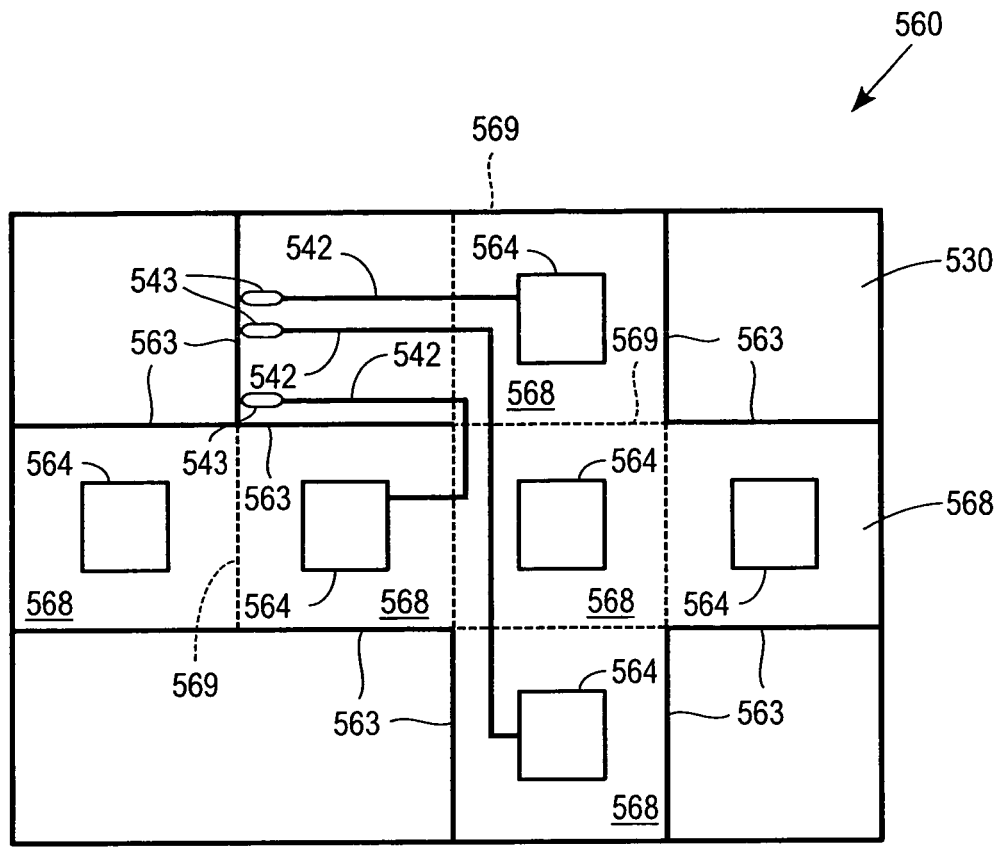
FIG. 5 depicts an exemplary embodiment of a two-dimensional, flexible circuit.

Exemplary embodiments of the piezoelectric devices can be fabricated from a two-dimensional, flexible circuit. FIG. 5 depicts an exemplary embodiment of a two-dimensional, flexible circuit 560 fabricated on a dielectric substrate 530. The dielectric substrate 530 can be composed of any suitable dielectric material, such as the dielectric materials described above. In the embodiment, the substrate 530 is divided into regions 568 defined by cut lines 563 and fold lines 569. The flexible circuit 560 is fabricated by patterning electrodes 542 on the dielectric substrate 530. Connecting pads 543 are provided on ends of the electrodes 542. In FIG. 5, each region 568 includes a single piezoelectric device 564. In other exemplary embodiments, each region 568 can include more than one piezoelectric device 564, such as two, three, four or more piezoelectric devices 564. In an exemplary embodiment, the individual piezoelectric devices 564 formed on the substrate 530 can have the same layer structure, and can be formed by the same techniques, as those described above for the piezoelectric device shown 204 in FIG. 2. In other exemplary embodiments, the piezoelectric devices 564 can have alternative constructions and can be formed by different processes. The piezoelectric material of the piezoelectric devices 564 can comprise one or more layers. An individual rigid thrust plate (not shown) is typically arranged on top of the piezoelectric device(s) 564 of each respective region 568. The thrust plates can have approximately the same length and width dimensions as the regions 568.

In some other exemplary embodiments, all six regions 568 do not include one more piezoelectric devices 564. For example, embodiments of a single-axis sensor can include one or more piezoelectric devices 564 in only one or two regions, and embodiments of a two-axis sensor can include one or more piezoelectric devices 564 in only two, three or four regions.

Figure 6:
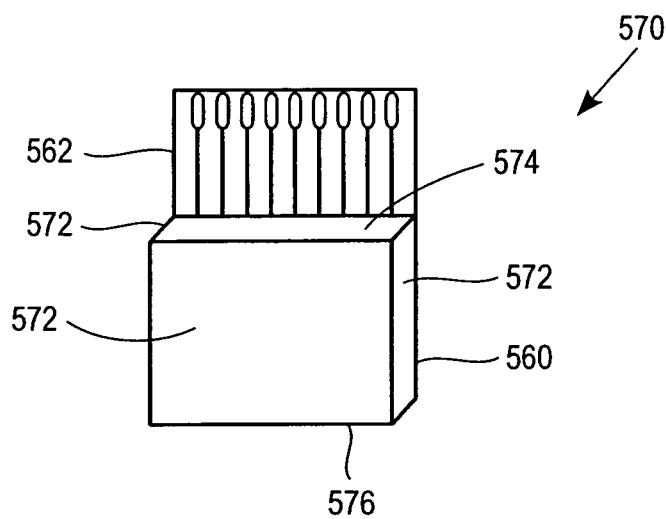
FIG. 6 depicts an exemplary embodiment of a shock and vibration sensor made from the flexible circuit of FIG. 5.

The flexible circuit 560 can be formed into a three-dimensional sensor. FIG. 6 shows an exemplary three-dimensional sensor 570 having a box configuration. The sensor 570 is formed by folding the substrate 530 along the fold lines 569. The sensor 570 includes four sides 572, a top 574 and a bottom 576, which correspond to regions 568 shown in FIG. 5. The sides can be bonded to each other. In the sensor 570, the piezoelectric devices 564 are located at the inner surfaces of the sides 572, top 574 and bottom 576. Thrust plates are arranged inside of the flexible circuit 560 to the inside of the piezoelectric devices 564 to cover each respective region 568 (not shown). A proof mass surrounded by a compliant material can be placed inside of the flexible circuit 560. For example, proof mass 402 and compliant material 432 shown in FIG. 4 can be used. Low-friction surfaces, e.g., spheres, can be embedded in the compliant material, such that the spheres contact the proof mass and the thrust plates provided for each respective region. This construction of the sensor is effective to distribute loads and reduce friction between the thrust plates and proof mass. The sensor 570 can be inserted into a rigid housing.

In the embodiment, the sensor 570 includes a connector tab 562 for sending a signal from the flexible circuit 560 to another circuit associated with the sensor. For example, the circuit can include individual circuits connected to each piezoelectric device 564.

Figure 7:
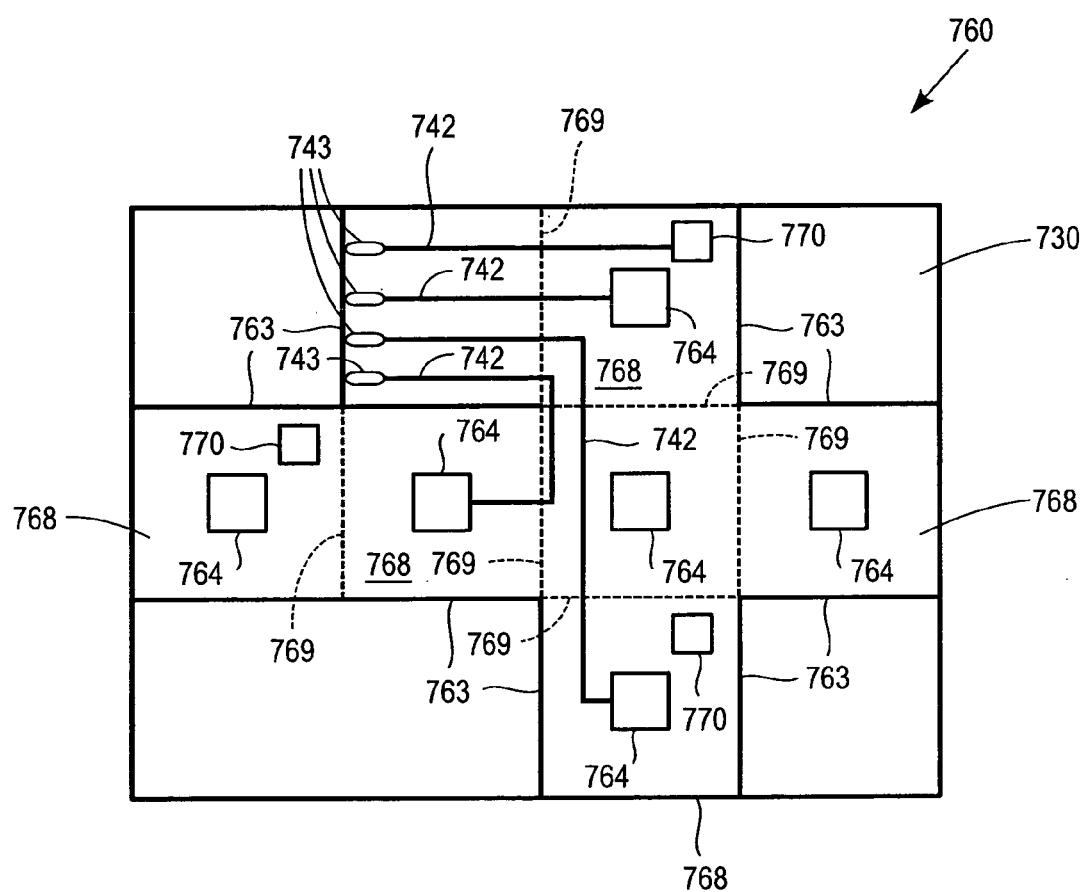
FIG. 7 depicts another exemplary embodiment of a two-dimensional, flexible circuit including electronic circuits.

Another exemplary embodiment of the flexible circuits is shown in FIG. 7. The flexible circuit 760 integrates sensor electronics on substrate 730. The flexible circuit 760 includes six regions 768 defined by cut lines 763 and fold lines 769. Each region 768 includes a piezoelectric device 764. In other embodiments, individual regions 768 can include two, three, four or more piezoelectric devices 764. In the embodiment, electronic circuits 770 are formed on the substrate 730 in several of the regions 768. The electronic circuits 770 are operatively associated with the piezoelectric device(s) 764. In the embodiment, the individual piezoelectric devices 764 formed on the substrate 730 can have the same structure, and can be formed by the same techniques, as described above for the piezoelectric device shown 204 in FIG. 2. In other exemplary embodiments, the piezoelectric devices 764 can have alternative constructions and can be formed by different processes.

The flexible circuit 760 is constructed such that it can formed into a three-dimensional configuration. The flexible circuit 760 can be formed into a box configuration, such as that of the sensor 570 shown in FIG. 6, by folding the substrate along fold lines 763. The sides can be bonded to each other. In the sensor, the piezoelectric devices 764 are located at the inner surfaces of the sides, top and bottom of the box. Thrust plates are arranged inside of the flexible circuit 760 to the inside of the piezoelectric devices 764 to cover each respective region 768 (not shown). A proof mass surrounded by a compliant material can be placed inside of the flexible circuit 760. Low-friction surfaces, e.g., spheres, can be embedded in the compliant material, such that the spheres contact the proof mass and the thrust plates provided for each respective region.

Figure 8:
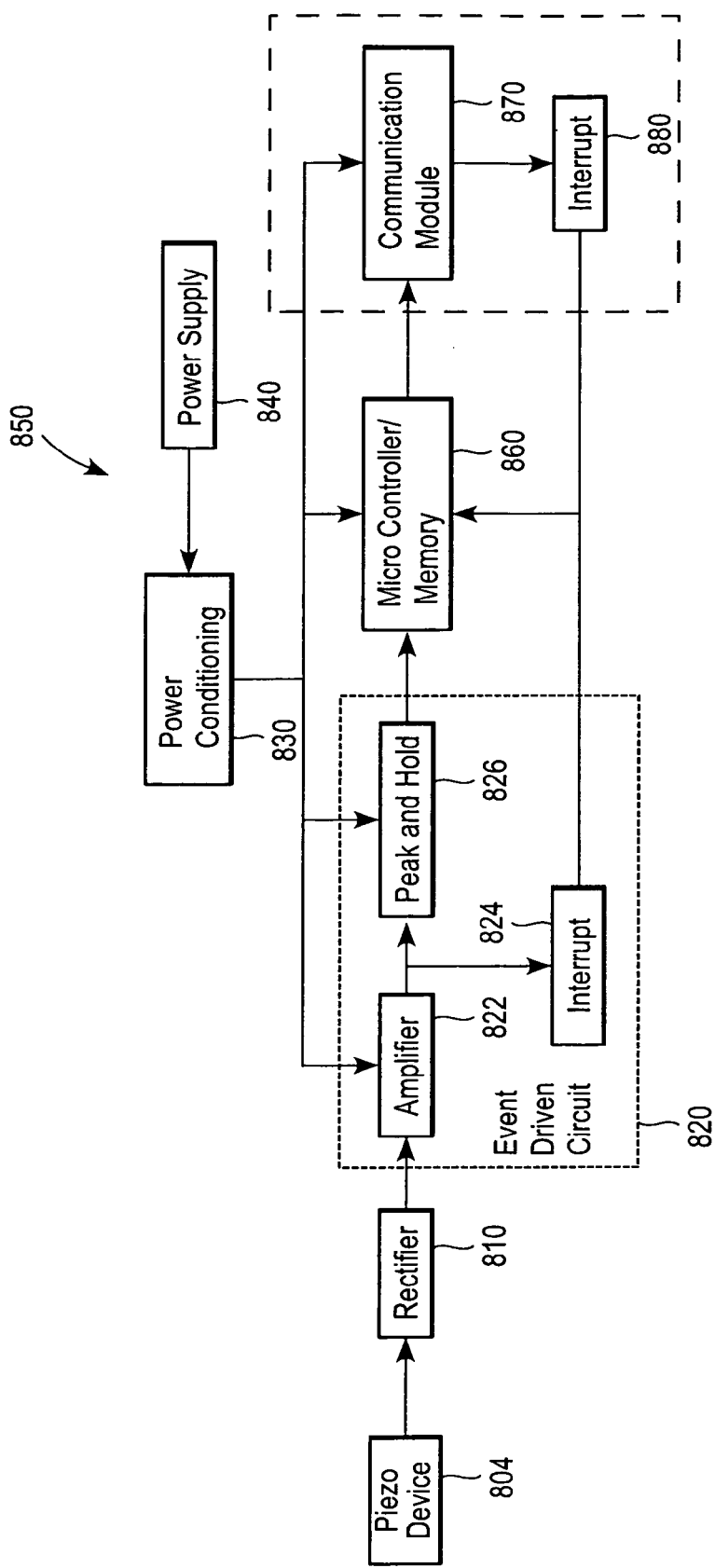
FIG. 8 depicts a functional block diagram of an exemplary embodiment of an electronic circuit for a shock and vibration sensor.

FIG. 8 depicts a functional block diagram of an exemplary embodiment of an electronic circuit 850 connected to a piezoelectric device 804. The electronic circuit 850 is at least partially controlled in response to current generated from the piezoelectric device 804 due to an object that the sensor is operatively associated with being subjected to a stimulus. The sensor can be in direct contact with the object, or, for example, supported by another element (e.g., a base) that is in direct contact with the object.

Figure 9:
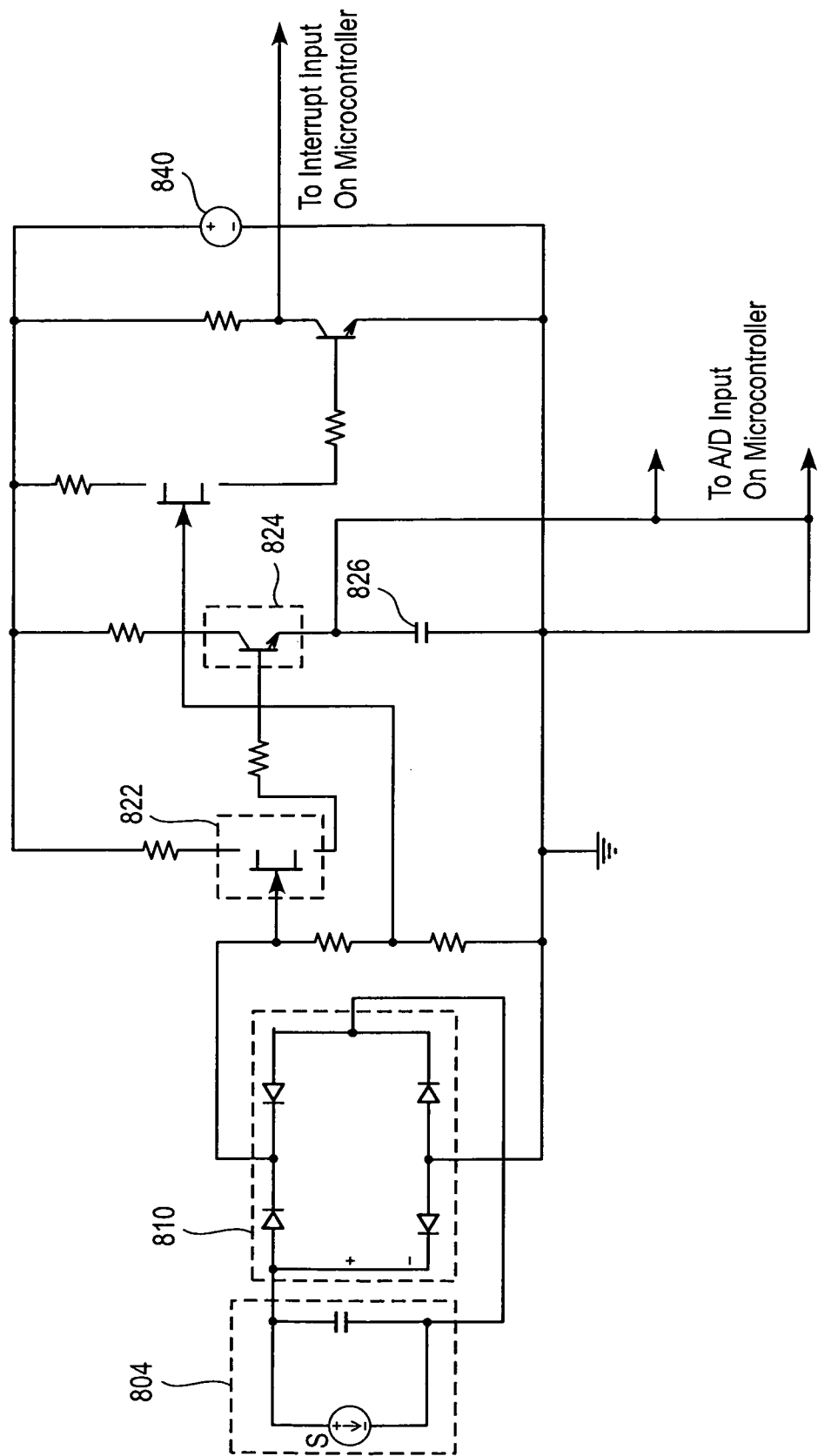
FIG. 9 depicts an exemplary model circuit diagram for the electronic circuit of FIG. 8.

FIG. 9 shows a model circuit diagram for a portion of the electronic circuit 850 shown in FIG. 8. In FIG. 9, the power conditioning 830, communication module 870 and interrupt 880 depicted in FIG. 8 are not shown for simplicity. The electronic circuit 850 is normally in a sleep mode, i.e., when no transient acceleration is present. In the sleep mode, the electronic circuit 850 draws a low current. Embodiments of the electronic circuit 850 are constructed to draw, when in a sleep mode, a current of less than about 20 mA (which is the current drawn by a typical accelerometer). For example, embodiments of the electronic circuit 850 are constructed to draw a current of less than about 10 mA, about 1 mA, about 500 µA, about 100 µA, about 10 µA, or about 1 µA from the battery 840. The electronic circuit 850 is also operable to wake up quickly form the sleep mode, such as in less than about 50 ms, about 10 ms, or about 1 ms. By normally drawing such low current the electronic circuit 850 can extend the life of the battery 840 to at least about 1 year, such as about 2 years, about 5 years, about 10 years, or even longer.

In the exemplary embodiment, the electronic circuit 850 is connected to a single piezoelectric device 804. The piezoelectric device 804 can be, for example, one of the piezoelectric devices 404 shown in FIG. 4, the piezoelectric device 204 shown in FIG. 2, or one of the piezoelectric devices 104 shown in FIG. 1. Each of the piezoelectric devices 404 of the sensor 400, for example, can be connected to a separate electronic circuit 850.

When the sensor including the piezoelectric device 804 is subjected to a stimulus, the piezoelectric material of the piezoelectric device 804 is mechanically deformed. This deformation causes the piezoelectric device 804 to generate a charge. When the piezoelectric material is compressed, a positive voltage is produced. When the piezoelectric material is subjected to tension, a negative voltage is produced. In the embodiment, the electronic circuit 850 includes a full wave rectifier 810 operable to rectify the signal generated by the voltage of the piezoelectric device 804 such that the voltage is always positive and the current flows in one direction.

In the embodiment, the electronic circuit 850 comprises an event driven circuit 820. The event driven circuit 820 includes an amplifier 822 and an interrupt 824 (e.g., amplifier 824) that detects changes in the piezoelectric device 804 charge with time (i.e., current). The amplifier 822 and 824 converts the magnitude of the current to a voltage and stores the voltage in a peak and hold 826 (e.g., capacitor 826). In real time, the current is sensed to determine whether it exceeds a threshold current corresponding to a threshold transient acceleration. For multi-axis sensors that include at least three piezoelectric devices and associated electronic circuits, the threshold acceleration has three directional components $a_x$, $a_y$, and $a_z$, for the respective x, y and z axes of the sensor. These three threshold transient accelerations can have the same or different magnitudes. The threshold accelerations can be selected to correspond to accelerations that can cause damage to the object. The capacitor 826 holds the peak voltage for a sufficient period of time for microcontroller 850 to read the peak voltage value. When the piezoelectric device 804 generates a current that exceeds the threshold current, the amplifier 822 and 824 draws current from a power conditioning unit 830 connected to power supply 840 (i.e., battery) to create a voltage in proportion to the current from the piezoelectric device 804. The voltage on the capacitor 822 is directly proportional to the amplitude of the transient acceleration.

The signal from the piezoelectric device 804 is also detected by the circuit associated with amplifier 830, and this voltage triggers an interrupt 824, which uses the rectified signal (through a JFET), to awaken the microcontroller 860 from its sleep mode. The microcontroller 860 can monitor the interrupt 824 and release a counter to determine the duration of the stimulus. The counter value infers the frequency of the stimulus. The size of the capacitor 826 can be selected to maintain its peak voltage with minimal sag, and to allow the microcontroller 860 to react to the interrupt and read the peak capacitor voltage value. The awoken microcontroller 860 reads the peak value stored by the peak and hold unit 826 and records the peak value in a memory along with a time stamp, indicating both the amplitude and time of the event. If there is no additional information stored by the peak and hold unit 826 (i.e., information related to other events that exceed the threshold acceleration value), the micro-controller 860 then goes back to sleep.

Minutes, hours, days, months, or years later, a communication module 870 connected to the microcontroller 860 is activated. The communication module 870 can be activated from an outside stimulus, such as RFID reader. Activating the communication module 870 triggers an interrupt 880 that awakens the microcontroller 860 to allow the stored peak value(s) to be read by the communication module 870 and recorded on another device. The micro-controller 860 then goes back to sleep. In FIG. 9, the communication module 870 and interrupt 880 are not shown for simplicity.

As discussed above, an electronic circuit, such as the electronic circuit 850, can be connected to each individual piezoelectric device of the shock and vibration sensor. For such embodiments of the sensor, when an object is subjected to shock or vibration, depending on the magnitude and direction of the shock with respect to the piezoelectric devices, less than all of the sensors typically may not generate a current that exceeds the threshold current. The magnitude and direction of the transient acceleration is determined from the individual current values generated from the piezoelectric devices. For example, when the sensor 400 shown in FIG. 4 is subjected to a purely axial force in the vertical direction, the current values generated from the piezoelectric devices 404 associated with the side surfaces of the proof mass 402 are essentially zero, and the magnitude and direction of the transient acceleration is determined from the piezoelectric devices 404 devices associated with the top and bottom surfaces of the proof mass 402.

Figure 10:
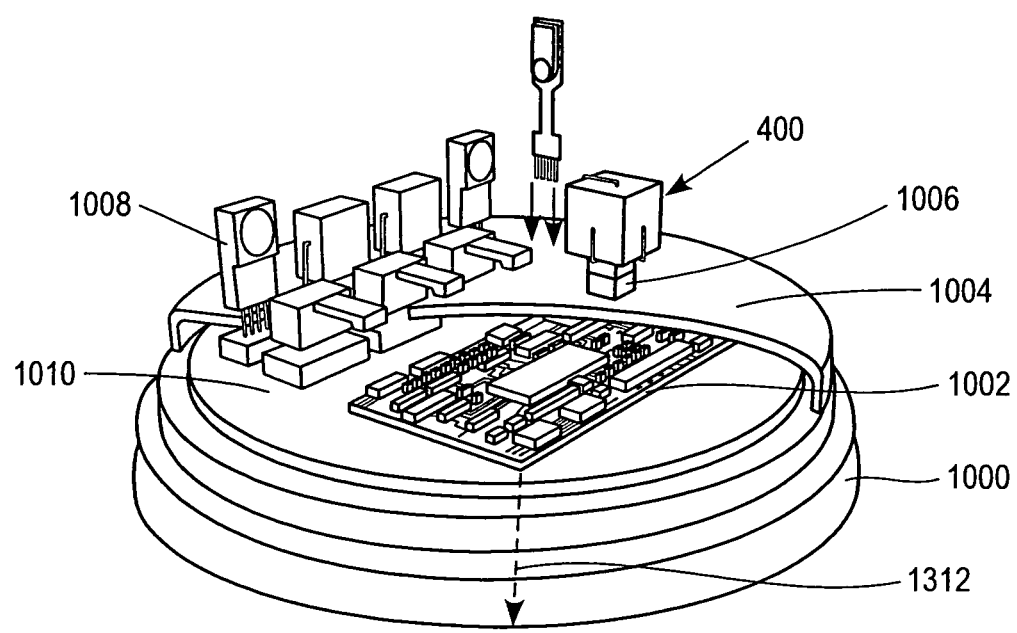
FIG. 10 shows an exemplary application of an embodiment of the shock and vibration sensors.

FIG. 10 depicts the sensor 400 shown in FIG. 4 mounted on a mounting plate 1000 including a mother board 1002 and a protective cover 1004 over the mother board 1002. The sensor 400 is connected to a PC board connector 1006 on the protective cover 1004. Other sensor electronics 1008 (e.g., sensor I/F electronics) are provided on a backplane or interconnect 1010.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A low-power sensor for monitoring exposure of an object to a stimulus, the sensor comprising:
    a plurality of low-friction surfaces;
    a proof mass comprising a plurality of planar surfaces, wherein each low-friction surface contacts a respective planar surface of the proof mass;
    at least one first piezoelectric device operable to generate a current when the proof mass imparts a force on the at least one first piezoelectric device in response to the proof mass undergoing a transient acceleration when the object is subjected to a stimulus; and
    a first electronic circuit connected to the at least one first piezoelectric device, wherein the first electronic circuit is at least partially controlled in response to the current generated from the at least one first piezoelectric device due to the stimulus.

2. The sensor of claim 1, comprising a rigid housing, wherein the proof mass and the at least one first piezoelectric device are inside of the rigid housing.

3. The sensor of claim 1, further comprising a first thrust plate in contact with a first surface of the proof mass and the at least one first piezoelectric device.

4. The sensor of claim 1,
    wherein the low-friction surfaces are surfaces of a plurality of respective spheres;
    wherein the sensor comprises a compliant material with a plurality of cavities, and
    wherein each of the spheres is held and rotatable within a respective one of the cavities.

5. The sensor of claim 1, wherein the at least one first piezoelectric device comprises at least one of lead zirconate titanate ceramic material and ferroelectric material.

6. The sensor of claim 1, wherein the at least one first piezoelectric device comprises at least two layers of piezoelectric material.

7. The sensor of claim 1, further comprising:
    at least one second piezoelectric device operable to generate a current when the proof mass imparts a force on the at least one second piezoelectric device in response to the proof mass undergoing the transient acceleration, wherein the at least one second piezoelectric device faces a first planar surface of the proof mass opposite to a second planar surface of the proof mass faced by the at least one first piezoelectric device; and a second electronic circuit connected to the at least one second piezoelectric device, wherein the second electronic circuit is at least partially controlled in response to the current generated from the at least one second piezoelectric device due to the stimulus.

8. The sensor of claim 1, wherein the first electronic circuit is operable to:
convert the magnitude of the current to a first voltage;
store the first voltage;
in real time, sense the current and determine whether the current exceeds a threshold current corresponding to a threshold transient acceleration;
when the current exceeds the threshold current, create a second voltage from the current produced by the stimulus, wherein the second voltage triggers an interrupt;
monitor the interrupt to determine the duration of the stimulus;
store a peak value of the first voltage proportional to the current generated by the stimulus; and
read the peak value of the first voltage and record the peak value and a time stamp in a memory.

9. The sensor of claim 8, wherein the first electronic circuit is further operable to determine the duration and frequency of the stimulus.

10. The sensor of claim 1, wherein the first electronic circuit comprises a power supply and is operable to draw a current of less than about 20 mA from the power supply when no transient acceleration is present.

11. The sensor of claim 10, wherein the first electronic circuit is operable to draw a current of less than about 10 µA from the power supply when no transient acceleration is present.

12. The sensor of claim 1, wherein the first electronic circuit comprises:
an event driven circuit operable to (i) convert the magnitude of the current to a first voltage, (ii) in real time, sense the current to determine whether the current exceeds a threshold current corresponding to a threshold transient acceleration, and (iii) when the current exceeds the threshold current, create a second voltage proportional to the current, wherein the second voltage triggers an interrupt;
a peak and hold unit operable to store a peak value of the first voltage proportional to the transient acceleration; and
a microcontroller operable to (i) monitor the interrupt to determine the duration of the stimulus and (ii) read the stored peak value of the first voltage and record the peak value and a time stamp in a memory.

13. The sensor of claim 12, wherein the microcontroller is operable to determine the duration and frequency of the transient acceleration.

14. The sensor of claim 1,
wherein the plurality of planar surfaces comprises at least first, second and third surfaces perpendicular to orthogonal x, y and z axes, respectively;
wherein the at least one first piezoelectric device is operatively associated with the first surface,
wherein the sensor comprises at least one second piezoelectric device operatively associated with the second surface,
wherein the sensor comprises at least one third piezoelectric device operatively associated with the third surface;
wherein at least one of the first, second and third piezoelectric devices is operable to generate a current when the proof mass imparts a force thereon in response to the proof mass undergoing a transient acceleration when the object is subjected to the stimulus; and
second and third electronic circuits connected to the second and third piezoelectric devices, respectively, and being at least partially controlled in response to the current generated from the at least one of the first, second and third piezoelectric devices, respectively, due to the stimulus.

15. The sensor of claim 14, further comprising:
a first thrust plate provided on the at least one first piezoelectric device;
a first low-friction surface contacting the first surface and the first thrust plate;
a second thrust plate provided on the at least one second piezoelectric device;
a second low-friction surface contacting the second surface and the second thrust plate;
a third thrust plate provided on the at least one third piezoelectric device; and
a third low-friction surface contacting the third surface and the third thrust plate;
wherein the first, second and third low friction surfaces are effective to reduce friction between the proof mass and the first, second and third thrust plates during the transient acceleration.

16. The sensor of claim 15, wherein:
the proof mass comprises a fourth surface opposite to the first surface, a fifth surface opposite to the second surface, and a sixth surface opposite to the third surface, the fourth, fifth and sixth surfaces being perpendicular to the x, y and z axes, respectively; and
the sensor further comprises:
at least one fourth piezoelectric device operatively associated with the fourth surface;
at least one fifth piezoelectric device operatively associated with the fifth surface;
at least one sixth piezoelectric device operatively associated with the sixth surface;
wherein at least one of the fourth, fifth and sixth piezoelectric devices is operable to generate a current when the proof mass imparts a force thereon in response to the proof mass undergoing the transient acceleration; and
fourth, fifth and sixth electronic circuits connected to the at least one fourth, fifth and sixth piezoelectric devices, respectively, wherein the fourth, fifth and sixth electronic circuits are at least partially controlled in response to the current generated from the at least one of the fourth, fifth and sixth piezoelectric devices, respectively, due to the stimulus.

17. The sensor of claim 16, further comprising:
a fourth thrust plate provided on the at least one fourth piezoelectric device;
a fourth low-friction surface contacting the fourth surface and the fourth thrust plate;
a fifth thrust plate provided on the at least one fifth piezoelectric device;
a fifth low-friction surface contacting the fifth surface and the fifth thrust plate;

a sixth thrust plate provided on the at least one sixth piezoelectric device; and a sixth low-friction surface contacting the sixth surface and the sixth thrust plate;

wherein the fourth, fifth and sixth low friction surfaces are effective to reduce friction between the proof mass and the at least one fourth, fifth and sixth piezoelectric devices during the transient acceleration.

18. The sensor of claim 15, wherein:

each of the first, second and third thrust plates comprises a planar contact surface; and the first, second and third low-friction surfaces are surfaces of rotatable spheres in contact with the planar contact surfaces of the first, second and third thrust plates, respectively.

19. The sensor of claim 18, further comprising an elastomeric material including a plurality of cavities, wherein each of the rotatable spheres is held and rotatable within a respective one of the cavities.

20. The sensor of claim 14, comprising a rigid housing, wherein the proof mass and first, second and third piezoelectric devices are inside of the rigid housing.

21. The sensor of claim 14, wherein the first, second and third piezoelectric devices comprise at least one of lead zirconate titanate ceramic material and ferroelectric material.

22. The sensor of claim 14, wherein each of the first, second and third piezoelectric devices comprises at least two layers of piezoelectric material.

23. The sensor of claim 14, wherein the first, second and third piezoelectric devices comprise a polymeric substrate on which the first, second and third electronic circuits are provided.

24. The sensor of claim 14, wherein each of the first, second and third electronic circuits is operable to:

convert the magnitude of the current to a first voltage;

store the first voltage;

in real time, sense the current and determine whether the current exceeds a threshold current corresponding to a threshold transient acceleration;

when the current exceeds the threshold current, create a second voltage from the current produced by the stimulus, wherein the second voltage triggers an interrupt;

monitor the interrupt to determine the duration of the stimulus;

store a peak value of the first voltage proportional to the current generated by the stimulus; and read the peak value of the first voltage and record the peak value and a time stamp in a memory.

25. The sensor of claim 24, wherein each of the first, second and third electronic circuits is further operable to determine the duration and frequency of the transient acceleration.

26. The sensor of claim 14, wherein each of the first, second and third electronic circuits includes a power supply and is operable to draw a current of less than about 20 mA from the power supply when no transient acceleration is present.

27. The sensor of claim 26, wherein each of the first, second and third electronic circuits is operable to draw a current of less than about 10 µA from the power supply when no transient acceleration is present.

28. The sensor of claim 14, wherein each of the first, second and third electronic circuits comprises:

an event driven circuit operable to (i) convert the magnitude of the current to a first voltage, (ii) in real time, sense the current and determine whether the current exceeds a threshold current corresponding to a threshold transient acceleration, and (iii) when the current exceeds the threshold current, create a second voltage proportional to the current, wherein the second voltage triggers an interrupt;

a peak and hold unit operable to store a peak value of the first voltage proportional to the transient acceleration; and a microcontroller operable to (i) monitor the interrupt to determine the duration of the stimulus and (ii) read the stored peak value of the first voltage and record the peak value and a time stamp in a memory.

29. The sensor of claim 28, wherein the microcontroller is further operable to determine the duration and frequency of the transient acceleration.

30. A method of monitoring exposure of an object to a stimulus, comprising:

arranging a sensor with respect to an object, the sensor comprising:

a proof mass;

at least one first piezoelectric device operable to generate a current when the proof mass imparts a force on the at least one first piezoelectric device in response to the proof mass undergoing a transient acceleration when the object is subjected to a stimulus; and a first electronic circuit connected to the at least one first piezoelectric device, wherein the first electronic circuit is at least partially controlled in response to the current generated from the at least one first piezoelectric device due to the stimulus;

converting a magnitude of the current to a first voltage;

storing the first voltage;

in real time, sensing the current and determining whether the current exceeds a threshold current corresponding to a threshold transient acceleration;

when the current exceeds the threshold current, creating a second voltage from the current produced by the stimulus, wherein the second voltage triggers an interrupt;

monitoring the interrupt to determine a duration of the stimulus;

storing a peak value of the first voltage proportional to the current generated by the stimulus; and reading the peak value of the first voltage and recording the peak value and a time stamp in a memory.

31. The method of claim 30, further comprising determining the duration and frequency of the transient acceleration.

32. A low-power sensor for monitoring exposure of an object to a stimulus, the sensor comprising:

a proof mass;

at least one first piezoelectric device operable to generate a current when the proof mass imparts a force on the at least one first piezoelectric device in response to the proof mass undergoing a transient acceleration when the object is subjected to a stimulus; and a first electronic circuit connected to the at least one first piezoelectric device, the first electronic circuit comprising:

an event driven circuit operable to (i) convert a magnitude of the current to a first voltage, (ii) in real time, sense the current to determine whether the current exceeds a threshold current corresponding to a threshold transient acceleration, and (iii) when the current exceeds the threshold current, create a second voltage proportional to the current, wherein the second voltage triggers an interrupt;

a peak and hold unit operable to store a peak value of the first voltage proportional to the transient acceleration; and a microcontroller operable to (i) monitor the interrupt to determine the duration of the stimulus and (ii) read the stored peak value of the first voltage and record the peak value and a time stamp in a memory.

33. A low-power sensor for monitoring exposure of an object to a stimulus, the sensor comprising:
   a proof mass;
   at least one first piezoelectric device operable to generate a current when the proof mass imparts a force on the at least one first piezoelectric device in response to the proof mass undergoing a transient acceleration when the object is subjected to a stimulus;
   a peak and hold capacitor operable to store a voltage corresponding to the current;
   a first electronic circuit connected to the at least one first piezoelectric device, wherein the first electronic circuit is operable to generate an interrupt in response to the current generated from the at least one first piezoelectric device due to the stimulus; and
   a microcontroller operable to read a voltage value from the peak and hold capacitor in response to the interrupt.

* * * * *